United States Patent [19]

Koob

[11] 4,454,423
[45] Jun. 12, 1984

[54] CIRCUIT ARRANGEMENT FOR A RADIATION DETECTOR

[75] Inventor: Lothar Koob, Roettenbach, Fed. Rep. of Germany

[73] Assignee: Siemens Aktiengesellschaft, Berlin & Munich, Fed. Rep. of Germany

[21] Appl. No.: 370,834

[22] Filed: Apr. 22, 1982

[30] Foreign Application Priority Data

Apr. 22, 1981 [DE] Fed. Rep. of Germany ....... 3116072

[51] Int. Cl.³ ............................ G01T 1/16; H03F 3/70
[52] U.S. Cl. ..................................... 250/374; 328/127
[58] Field of Search ................ 328/127; 250/374, 385, 250/363 S; 307/246

[56] References Cited

U.S. PATENT DOCUMENTS

| | | | |
|---|---|---|---|
| 3,268,824 | 8/1966 | Hinrichs et al. | 328/127 |
| 3,508,540 | 4/1970 | Cavallari et al. | 328/127 |
| 4,117,332 | 9/1978 | Felton et al. | 250/374 |
| 4,134,018 | 1/1979 | Weinkauf et al. | 250/363 S |
| 4,223,271 | 9/1980 | Furukawa | 328/127 |

*Primary Examiner*—John S. Heyman
*Attorney, Agent, or Firm*—Hill, Van Santen, Steadman & Simpson

[57] ABSTRACT

In an exemplary embodiment, an integrator circuit for the detector output signal comprises a capacitance which is directly charged by the radiation detector. Between the capacitance and an associated charge amplifier a switch is disposed for the selective transmission of the charge of the capacitance to the charge amplifier.

2 Claims, 3 Drawing Figures

CIRCUIT ARRANGEMENT FOR A RADIATION DETECTOR

BACKGROUND OF THE INVENTION

The invention relates to a circuit arrangement for a radiation detector for the purpose of a conversion of radiation into corresponding electrical signals, in which there is connected with the radiation detector an integrator circuit for the detector output signal with a capacitance which directly supplies a signal representing the time integral of the output signal of the radiation detector.

A circuit arrangement of this type is described in the German patent application P 30 01 131.5. This circuit arrangement can be employed in the case of a computer tomograph in which several detectors are provided for the measurement of the x-radiation which has permeated a patient layer to be imaged. In the case of the cited circuit arrangement, following the end of the integration interval, the voltage built up on the capacitance is supplied via an impedance stage to the input of an amplifier. After the voltage has been sampled and processed by the impedance stage, the capacitance is discharged with the aid of a parallel-connected switch, and the capacitor is then available for the next integration.

SUMMARY OF THE INVENTION

In the case of detectors having a high bias voltage for example xenon detectors, which, in a chamber filled with xenon gas, exhibit two electrodes to which a high voltage is connected and between which a current dependent upon the the received radiation intensity flows, a build up of voltage can be permitted up to a maximally possible processing level, for example for a multiplexer or A/D converter. Accordingly, the object underlying the invention is to exploit this circumstance for the reduction of the circuit outlay.

In accordance with the invention this object is achieved in that, between the capacitance and an outlet-connected charge amplifier, a switch is arranged for the transmission of the charge of the capacitance to the charge amplifier. In the case of the inventive circuit arrangement, in contrast to the initially described known circuit arrangement, the voltage at the capacitance is not sampled via an impedance stage which in this instance serves as switching means; on the contrary, the capacitance is discharged into an outlet-connected charge amplifier via a switch. Thus, a special discharge switch disposed parallel to the capacitance can be dispensed with.

The charge amplifier which is equipped with a capacitance can exhibit a discharge switch for its discharge following the evaluation of the respective measured value.

The invention shall be explained in greater detail in the following on the basis of an exemplary embodiment illustrated on the accompanying drawing sheet; and other objects, features and advantages will be apparent from this detailed disclosure and from the appended claims.

DETAILED DESCRIPTION

Figure 1:
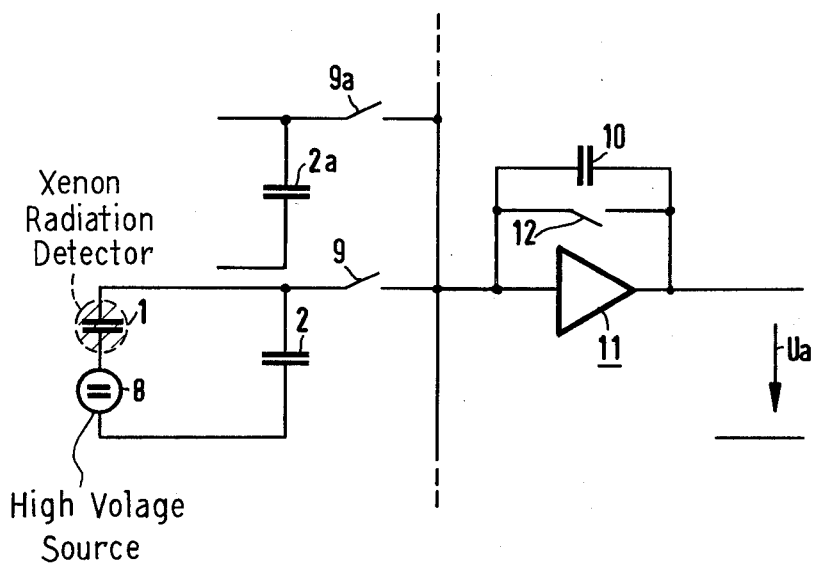
FIG. 1 shows an electric circuit diagram for illustrating an embodiment of the present invention.

In the drawing, a detector 1 is illustrated which consists, for example, of a cell—filled under pressure with xenon—with two electrodes and which is connected to a high voltage source 8. Disposed parallel to the series connection consisting of the detector 1 and the high voltage source 8 is a capacitance 2 which, during a predetermined interval, collects a charge which is dependent upon the received radiation intensity. After expiration of the integration interval an electronic switch 9 is closed which supplies the charge built up in the capacitance 2 to a charge amplifier 11 wired with a capacitance 10. The output signal of the charge amplifier 11 thus corresponds, in the case of a specified integration interval, to the received radiation intensity and, upon closure of the switch 9, the capacitance 2 is discharged and is thus available for a new integration. Following the evaluation of the respective measured value the capacitance 10 of the charge amplifier 11 is discharged via an electronic switch 12.

From the drawing it is apparent that several measurement channels for the purpose of evaluation can be successively connected with one charge amplifier. The capacitance of an additional measurement channel is designated with 2a and the associated switch with 9a.

It will be apparent that many modifications and variations may be made without departing from the scope of the teachings and concepts of the present invention.

SUPPLEMENTARY DISCUSSION

The waveforms associated with the illustrated circuit serve to diagrammatically indicate the operation. A radiation pulse is indicated at x which may be produced by a source such as indicated at one in the first figure of U.S. Pat. No. 4,134,018. Each of the capacitors such as 2, 2a of the respective channels receives a charge during the radiation pulse representing the respective incident radiation intensity. The charge level on capacitor 2 (as indicated at $U_2$) is first read out by closing switch 9 (as indicated at 9-1) whereupon the charge produced on capacitor 10 of the charge amplifier 11 (as indicated at $U_{10\text{-}I}$) may reach a maximum magnitude $U_a$ representing the maximum signal level which can be processed in the following circuitry (which may include an analog to digital converter for converting analog signals up to a maximum magnitude $U_a$).

Upon closure of switch 9a (as indicated at 9a-1), the charge on capacitor 2a (indicated by waveform $U_{2a}$) is read out and results in a proportionately amplified charge on capacitor 10 (as indicated at $U_{10\text{-}II}$). Thus each successive channel of the group of channels common to charge amplifier 11 may be read in sequence, and the respective output values from the charge amplifier 11 may be converted to digital form during the respective intervals between operation of a respective transfer switch (such as 9, 9a) and the operation of the reset switch 12 (as indicated at 12-I and 12-II).

Figure 2:
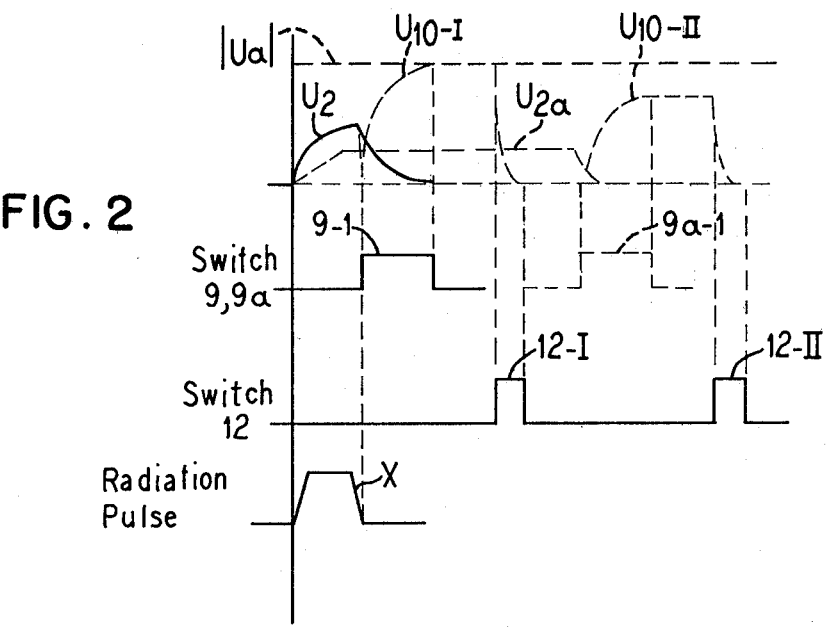
FIG. 2 shows waveforms for explaining the operation of the circuit of FIG. 1 for the case where the detectors are to respond to a radiation pulse.
Figure 3:
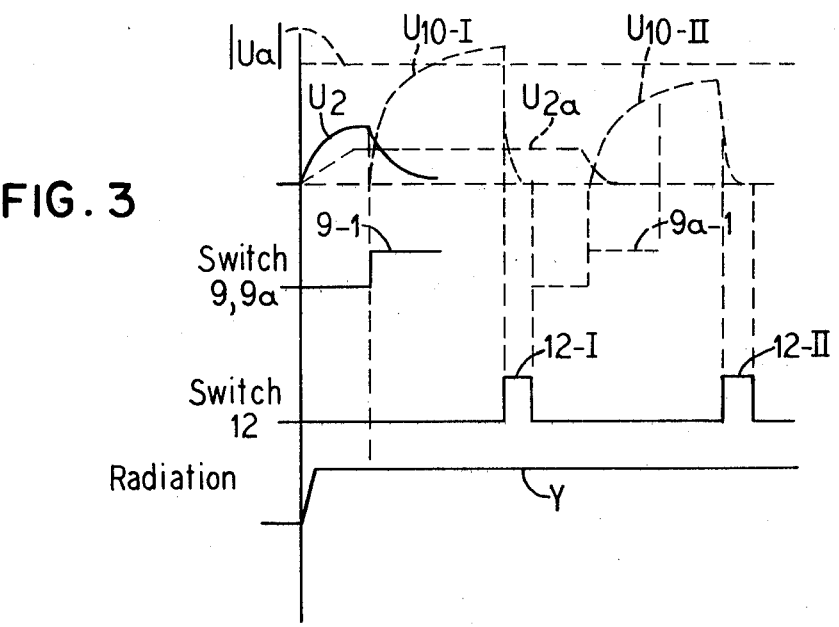
FIG. 3 is a waveform diagram similar to FIG. 2 but illustrating the case wherein the radiation is present during the readout from a series of radiation detector circuits such as indicated in FIG. 1.

While FIG. 2 illustrates the waveforms for the case of a radiation pulse X which is complete prior to readout from the respective detector circuits such as shown in FIG. 1, FIG. 3 illustrates the corresponding waveforms for the case where the radiation has a duration as indicated at Y which extends over the time during which a series of the detector circuits such as indicated in FIG. 1 are sequentially coupled with the charge amplifier 11.

I claim as my invention:

1. A circuit arrangement comprising a radiation detector for the conversion of radiation into corresponding electric signals, an integrator circuit for connection with the radiation detector to receive the detector output signal, said integrator circuit comprising a capacitance for directly integrating the output signal of the radiation detector to generate a measure of the radiation incident on the detector, a charge amplifier for selective coupling with said capacitance, and, between the capacitance and said charge amplifier, essentially only a switch being connected for the transmission of the charge of the capacitance to the charge amplifier.

2. A circuit arrangement according to claim 1, characterized in that the charge amplifier has an output for supplying a measured value signal in accordance with the charge transmitted thereto, such that the measured value signal represents a respective measured value of radiation as sensed by the radiation detector, said charge amplifier having a discharge switch for the discharge of a charge transmitted thereto following an evaluation of a respective measured value.

* * * * *